Patented Oct. 19, 1954

2,692,289

UNITED STATES PATENT OFFICE 2,692,289

MANUFACTURE OF 1:1:3-TRIMETHYL-CYCLOHEXANONE-5

William Edgar Nelson, Newport, Wales, assignor to The Distillers Company Limited, Edinburgh, Scotland, a British company No Drawing. Application April 28, 1950, Serial No. 158,940

Claims priority, application Great Britain May 6, 1949

8 Claims. (Cl. 260—586)

The present invention relates to the manufacture of 1:1:3-trimethylcyclohexanone-5.

According to the invention the process for the preparation of 1:1:3-trimethylcyclohexanone-5 comprises condensing isopropyl alcohol in the liquid phase in the presence of alkali metal hydroxide or alcoholate at temperatures in excess of 150° C. and oxidising the 1:1:3-trimethylcyclohexanol-5 thus produced to 1:1:3-trimethylcyclohexanone.

The condensation reaction product containing the 1:1:3-trimethylcyclohexanol-5 may be oxidised as a whole, or the 1:1:3-trimethylcyclohexanol-5 may be partially or substantially completely isolated before being subjected to the oxidation step.

When it is desired to obtain the 1:1:3-trimethylcyclohexanone-5 in a relatively pure state, it is advantageous to isolate the 1:1:3-trimethylcyclohexanol-5 from the reaction mixture before subjecting it to the oxidation step. In these circumstances the separation of the trimethylcyclohexanol from the condensation reaction mixture may be effected by careful fractional distillation, preferably under diminished pressure, of the reaction mixture resulting from the condensation reaction. On distilling, advantageously after previous neutralisation, first unchanged isopropanol distills over, then methyl isobutyl carbinol, which is also formed by the condensation of isopropanol, and with it any other low boiling products which may be formed during the heating. Finally, trimethylcyclohexanol is collected in that fraction which corresponds to its known boiling point at the given pressure. This fraction, if sufficiently pure, crystallises on cooling to room temperature or somewhat below room temperature. If necessary, or desired, this fraction may be subjected to further refractionation.

The amount of alkali metal hydroxide or alcoholate employed in the condensation reaction is non-critical and may vary within wide limits. Amounts of 1 to 10% of the alkali metal hydroxide or alcoholate calculated on the isopropyl alcohol give satisfactory results. It is preferred to use potassium hydroxide as the alkali metal hydroxide. It is to be noted that in place of using an alkali metal alcoholate per se, the isopropyl alcohol may be mixed with an alkali metal hydroxide, the mixture dehydrated, for example by distillation in the presence of a small amount of benzene and the resulting solution, which will contain the corresponding alkali metal isopropylate, used for the condensation reaction. The temperature at which the condensation reaction is carried out is in excess of 150° C., advantageously between 250° and 300° C. The temperature employed must not be in excess of that at which the condensation reaction mixture will no longer be in the liquid phase. The upper limit of the temperature which may be employed is accordingly the critical temperature of the liquid reaction mixture. In order to maintain the isopropyl alcohol during the reaction in the liquid phase the condensation reaction may be carried out under pressure. During the condensation, which may be effected either batchwise or as a continuous process, hydrogen is liberated.

The isopropyl alcohol may be subjected to the condensation alone or in the presence of a solvent which reduces the pressure needed to maintain the isopropyl alcohol in the liquid phase during the condensation reaction, for example a hydrocarbon boiling appreciably above the boiling point of the alcohol being reacted. Methyl isobutyl carbinol may be used for this purpose. It is thus possible to recycle the methyl isobutyl carbinol which has been formed during the reaction or added initially together with unchanged isopropyl alcohol.

The condensation may preferably be carried out in metal vessels such as autoclaves of mild steel or stainless steel, or nickel lined vessels. It has been found useful to add to the reaction mixture small amounts of a finely divided metal such as copper bronze for catalysing the condensation of the alcohol starting material.

The yield of trimethylcyclohexanol and the speed of the condensation varies according to conditions of the condensation, such as pressures, temperatures and amounts of alkali metal hydroxide used. Thus, for example, increase in the pressure and/or temperature and/or amount of alkali will result in an increase in the speed of the reaction. It has further been ascertained that by increasing the total conversion of isopropyl alcohol, an increase in the yield of trimethylcyclohexanol is obtained at the expense of the lower boiling condensation products of isopropyl alcohol. It is therefore a preferred method of carrying out the process of the invention by condensing more than 20% of the isopropyl alcohol introduced.

The oxidation of the 1:1:3-trimethylcyclohexanol-5 to trimethylcyclohexanone can be effected, for instance by chemical oxidation, e. g. with chromic acid or, preferably, by catalytic dehydrogenation. In order to carry out the dehydrogenation the condensation reaction mixture resulting from the heat treatment of the isopropyl alcohol suitably after tarry low boiling products have been separated, or the isolated 1:1:3-trimethylcyclohexanol-5 may be vaporised and passed over a suitable dehydrogenation catalyst, such as zinc oxide or copper. The resulting trimethylcyclohexanone is then isolated from the condensate resulting from the dehydrogenation process, suitably by fractional distillation, and is a valuable solvent and intermediate. The dehydrogenation may also be carried out in the liquid phase, preferably in the presence of a nickel catalyst such as Raney nickel.

The ketone may be pyrolised in a known manner to 1:3-xylenol-5.

The following examples are given to illustrate the process of the present invention. The percentages quoted are by weight unless otherwise indicated.

Example 1

In a 10-litre autoclave made of stainless steel, 5 litres of dry isopropyl alcohol containing 8% potassium hydroxide is heated to 290° C. for 4 hours. The liquid reaction product is washed with a small amount of water and the top layer neutralised with acetic acid and then fractionated in the presence of water. The lowest boiling fraction contains some olefine. The next fraction, boiling between 78° and 88° C. at normal pressure, contains the unconverted isopropanol, and the fraction boiling between 88° and 97° C. contains the methyl isobutyl carbinol-water constant boiling mixture. The oil in the still kettle is now separated from the water and fractionated separately at 16-20 mm. pressure. A fraction boiling between 85° and 110° C. at 16 mm. is collected and identified as almost pure 1:1:3-trimethylcyclohexanol-5

26 grams of the 1:1:3-trimethylcyclohexanol-5 thus obtained and 60 grams of water are passed per hour over a zinc oxide catalyst (4-8 mesh) heated to 380° C. contained in a stainless steel tube, 200 centimetres long and 2.5 centimetres internal diameter. During the dehydrogenation 13 litres of hydrogen are produced. The product consists of an oil layer (78.5 grams) which analyses (hydroxylamine method) as 91.7% $C_9$ ketone, i. e. containing 72 grams ketone, and a further 0.5 gram is found in the aqueous layer which gives a yield of 88.7% of the theoretical. On distillation 86.5% of the 1:1:3-trimethylcyclohexanone-5 produced is recovered in pure form.

Example 2

200 grams of 1:1:3-trimethylcyclohexanol-5 obtained as described in Example 1 are oxidised by treatment with 100 grams of chromic acid in a solution of glacial acetic acid at 60°-70° C. The oxidation product obtained, amounts to 154 grams and contains 23.2% unreacted alcohol and 75.6% 1:1:3-trimethylcyclohexanone-5, which is separated by fractional distillation.

Example 3

In a 10 litre autoclave made of stainless steel, 5 litres of dry isopropyl alcohol containing 8% potassium hydroxide is heated to 290° C. for 4 hours. The liquid reaction product is stripped of unchanged isopropyl alcohol, washed with water to remove potassium hydroxide and dried; this dried liquid product is passed at a rate of 95 grams per hour through a 1 inch internal diameter mild steel tube packed with a pelleted copper on Kieselguhr catalyst (40% by weight copper), and heated to 370° C. The product thus obtained is fractionally distilled, and the 1:1:3-trimethylcyclohexanone-5 separated as a fraction boiling at 68-70° C. at a pressure of 748 millimetres of mercury.

Example 4

Isopropyl alcohol containing 8% by weight of potassium hydroxide is mixed with a little benzene and dehydrated in a still, by removing continuously the lower layer of the ternary azeotrope which distils. The resulting solution, in which more than half of the potassium hydroxide has been converted to potassium isopropylate is pumped continuously to the reactor, which consists of a heated vertical stainless steel tube, of ¾ inch bore and 300 millilitres capacity. The feed enters at the top of the tube at the rate of 150 millilitres per hour, and product is removed from the base, where provision is also made for separating any aqueous layer formed by the reaction. The reactor is pressurised to 80 atmospheres pressure and maintained at this pressure by venting the gas produced, and at a constant temperature of 250° C. The liquid reaction product is stripped of unchanged isopropyl alcohol, washed with water to remove potassium hydroxide and dried; this liquid product is then oxidised to 1:1:3-trimethylcyclohexanone as described in Example 3.

The process of this example is repeated as described above with the exception that the condensation reaction is carried out at temperatures of 274° C. and 296° C. respectively.

I claim:

1. A process for the preparation of 1:1:3-trimethylcyclohexanone-5 which comprises condensing isopropyl alcohol by heating in the liquid phase to a temperature in excess of 250° C. in the presence of an alkaline material selected from the group consisting of alkali metal hydroxide and alkali metal isopropylate, and thereafter oxidising the 1:1:3-trimethylcyclohexanol-5 thus produced to 1:1:3-trimethylcyclohexanone-5.

2. A process as claimed in claim 1, wherein the condensation of the isopropyl alcohol to 1:1:3-trimethylcyclohexanol-5 is carried out at a temperature of 250°-300° C.

3. A process as claimed in claim 1, wherein the condensation of the isopropyl alcohol to 1:1:3-trimethylcyclohexanol-5 is carried out in an inert solvent.

4. A process for the preparation of 1:1:3-trimethylcyclohexanone-5 which comprises condensing isopropyl alcohol by heating in the liquid phase to a temperature of 250°-300° C. in the presence of an alkaline material selected from the group consisting of alkali metal hydroxide and alkali metal isopropylate, distilling the reaction product to isolate a fraction comprising 1:1:3 - trimethylcyclohexanol - 5, and oxidising said fraction to give 1:1:3-trimethylcyclohexanone-5.

5. A process for the production of 1:1:3-trimethylcyclohexanone-5 which comprises condensing isopropyl alcohol by heating in the liquid phase to a temperature of 250°-300° C. in the presence of an alkaline material selected from the group consisting of alkali metal hydroxide and alkali metal isopropylate, and thereafter oxidising the 1:1:3-trimethylcyclohexanol-5 thus produced to 1:1:3-trimethylcyclohexanone-5 by treatment with chromic acid.

6. A process for the production of 1:1:3-trimethylcyclohexanone-5 which comprises condensing isopropyl alcohol by heating in the liquid phase to a temperature of 250°–300° C. in the presence of an alkaline material selected from the group consisting of alkali metal hydroxide and alkali metal isopropylate, and thereafter oxidising the 1:1:3-trimethylcyclohexanol-5 thus produced to 1:1:3-trimethylcyclohexanone-5 by catalytic dehydrogenation.

7. A process as claimed in claim 6, wherein the 1:1:3-trimethylcyclohexanol-5 is passed in the vapour phase over a catalyst selected from the group consisting of zinc oxide and copper catalysts.

8. A process as claimed in claim 6, wherein the 1:1:3-trimethylcyclohexanol-5 is passed in the liquid phase over a nickel catalyst.

References Cited in the file of this patent

UNITED STATES PATENTS

| Number | Name | Date |
|---|---|---|
| 1,892,011 | Sandkuhl | Dec. 27, 1932 |
| 2,163,284 | Lazier | June 20, 1939 |
| 2,303,550 | Houghton et al. | Dec. 1, 1942 |
| 2,338,445 | Laucht | Jan. 4, 1944 |
| 2,448,259 | Finch | Aug. 31, 1948 |

OTHER REFERENCES

Knoevenagel, Justus Liebig's Annalen, vol. 297, pp. 113–203 of which only pages 137, 196 and 197 are necessary (1897).

Guerbert, Compt. rend., vol. 149, pages 129, 132 (1909).